Oct. 6, 1970 H. J. MEIER 3,532,306
DEVICE FOR MAINTAINING EQUILIBRIUM OF THE MOMENTS
AROUND THE TRANSVERSE AXIS OF AN AIRPLANE
Filed Nov. 19, 1968 2 Sheets-Sheet 1
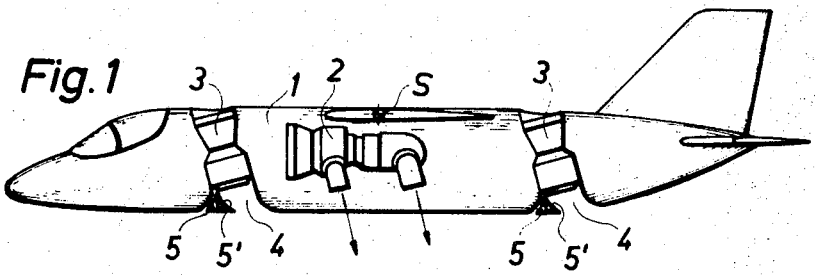
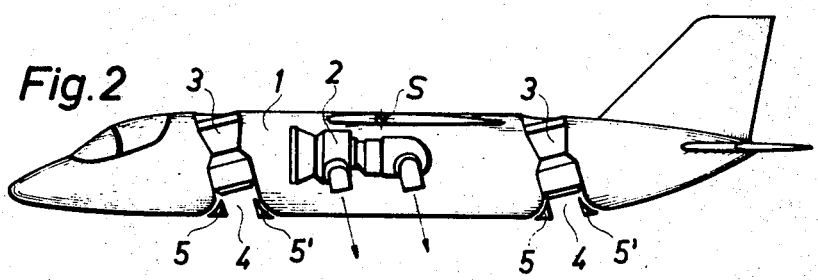
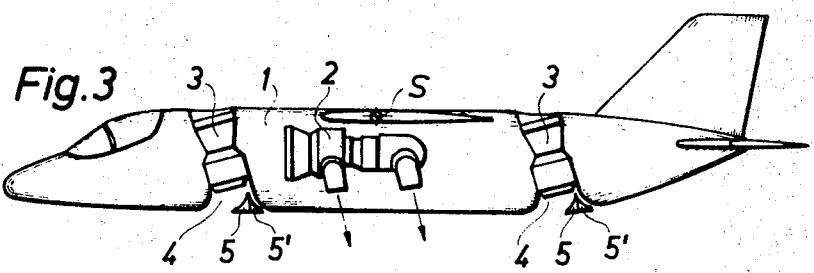
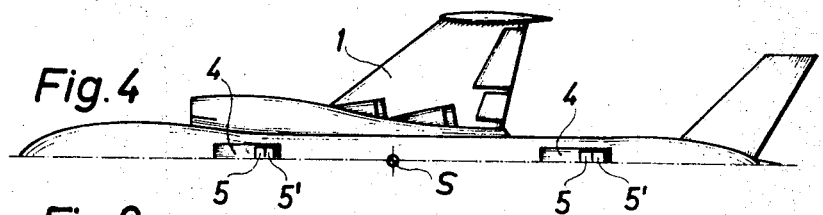
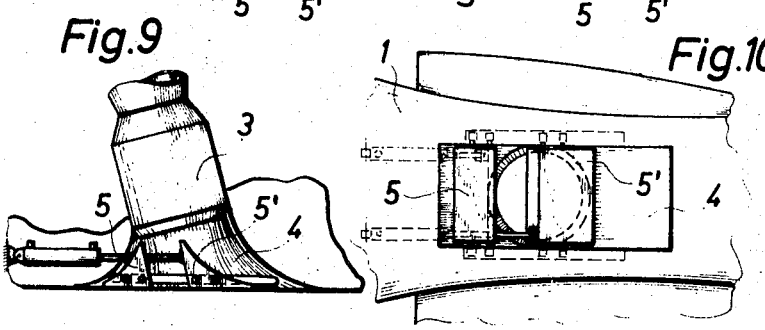
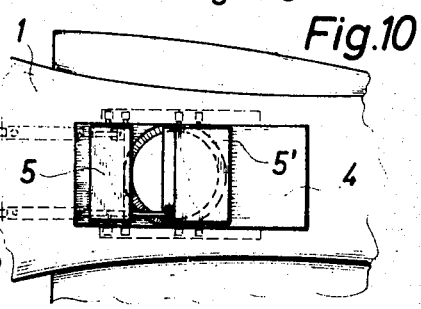
Inventor:
Hans Justus Meier
By

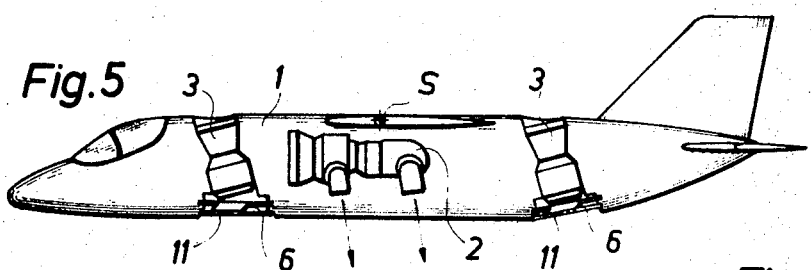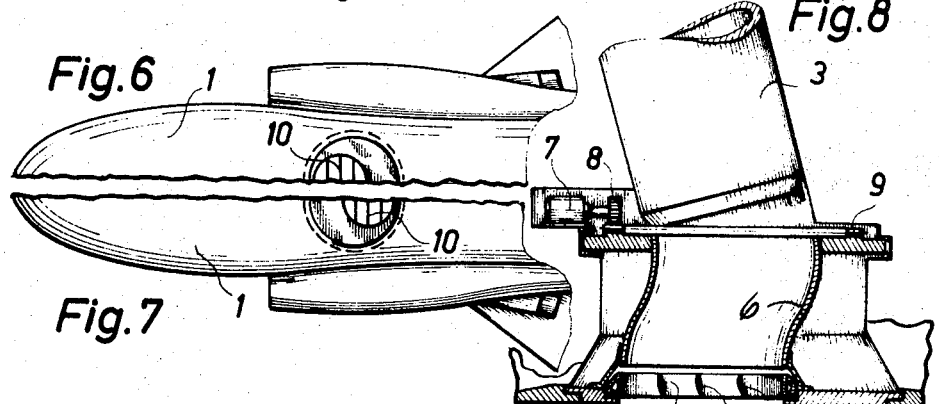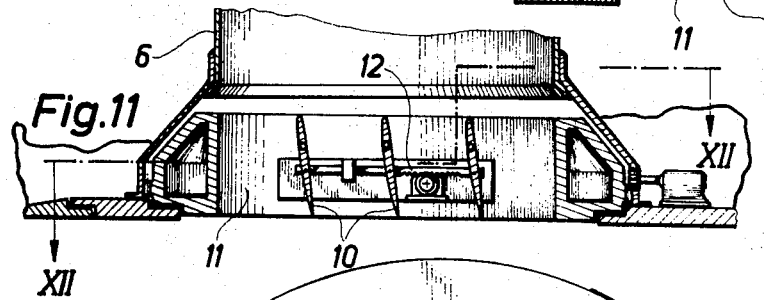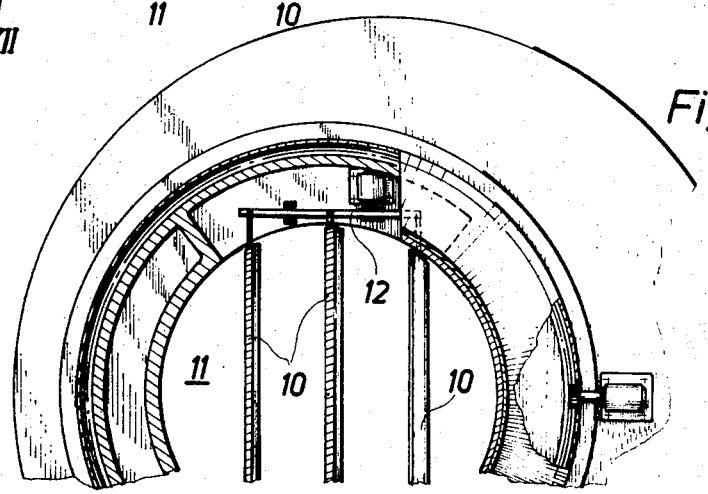

United States Patent Office 3,532,306
Patented Oct. 6, 1970

3,532,306
DEVICE FOR MAINTAINING EQUILIBRIUM OF THE MOMENTS AROUND THE TRANSVERSE AXIS OF AN AIRPLANE
Hans Justus Meier, Bremen, Germany, assignor to Vereinigte Flugtechnische Werke Gesellschaft mit beschrankter Haftung fruher "Weser" Flugzeugbau/ Focke-Wulf/Heinkel-Flugzeugbau, Bremen, Germany
Filed Nov. 19, 1968, Ser. No. 777,035
Claims priority, application Germany, Nov. 21, 1967, 1,531,473
Int. Cl. B64c *15/06;* B64d *27/20*
U.S. Cl. 244—53                         1 Claim

ABSTRACT OF THE DISCLOSURE

In combination with an airplane equipped within the region of its center of gravity with crusing drive means comprising nozzle means for cold thrust jets and nozzle means for hot thrust jets of which either the nozzle means for cold thrust jets or the nozzle means for hot thrust jets are respectively arranged in front of said center of gravity, or the rear of the center of gravity when looking in the longitudinal direction of the plane, an apparatus for maintaining the equilibrium of the moments around the transverse axis of the airplane, in which at least two lift drive means are respectively arranged in front and in the rear of the cruising drive means and having outlet and control means associated therewith while being operable selectively to guide the thrust jets passing through said outlet so as to cause said thrust jets to act as lift jets or to exert a moment acting counter to the predominance of a torque in one direction.

---

The present invention relates to a device for maintaining equilibrium of the moments around the transverse axis of an airplane adapted to start and land at an incline or perpendicularly to the ground, and which has a one or more swivel nozzle equipped jet drive, or drives for cruising A pair of swivel nozzles is provided for furnishing cold thrust jets whereas the other swivel nozzles exhaust the remaining hot thrust jets.

If, for purposes of increasing the thrust effect, the cold jets are heated or the hot jets are conveyed to an afterburner, the equilibrium of the moments will be disturbed. For maintaining the equilibrium of the moments about the transverse axis of the airplane it is then necessary to take suitable steps. Such steps consist, for instance, in reducing the thrust of the lift drives at the cold or hot nozzles if the airplane is equipped with lift drives in front or behind the center of gravity of the airplane. This, however, works counter to the increased thrust.

It is, therefore, an object of the present invention to overcome the above mentioned drawback.

It is another object of this invention to eliminate the above interference with the equilibrium of the moments, by means which will not necessitate a reduction in the thrust of the lift drives.

These and other objects and advantages of the invention will appear more clearly from the following specification, in connection with the accompanying drawings, in which:

FIG. 1 diagrammatically illustrates an airplane with swivel nozzle drive and with two lift drives, said lift drives each being equipped with two displaceable control members at the outlet in their front end position.

FIG. 2 illustrates the airplane of FIG. 1 with the control members occupying their position for lift thrust generation.

FIG. 3 shows the airplane of FIG. 1 with the control members occupying their rear end position.

FIG. 4 shows half of the airplane of FIG. 3 as seen from the bottom.

FIG. 5 diagrammatically illustrates an airplane with a swivel nozzle drive and two lift drives, each of which is equipped with curved short pipes at the outlet, said short pipes occupying their front end position.

FIG. 6 shows a portion of the airplane of FIG. 5 as sent from the bottom.

FIG. 7 illustrates the airplane of FIG. 6, but with the short pipes at the outlet occupying their rear end position.

FIG. 8 shows one of the curved short pipes at the outlet, but on a larger scale than in the preceding figures.

FIG. 9 shows the displaceable control members of FIGS. 1-4, but on a larger scale than the latter.

FIG. 10 shows the displaceable control member of FIG. 9 as seen from the bottom.

FIG. 11 shows a ring carrying pivotable guiding elements and being adapted to be turned with regard to the curved short pipes.

FIG. 12 is a section through FIG. 11 along the line XII—XII thereof.

The device according to the present invention is characterized primarily in that in front and behind the cruising drives there is respectively provided at least one lift drive, and is furthermore characterized in that each lift drive at the outlet comprises means adapted to guide the thrust jets in the sense of lift jets and also in the sense of producing a moment which will act counter to the predominance of a torque about the airplane axis in one direction.

At the outlet of each lift drive, in the direction of the longitudinal axis of the plane there may be arranged control members which are adjustable individually or in common, and which when one control member engages the front side and the other control member engages the rear side of the outlet, will permit the thrust jet to discharge unimpededly between the control members and which control members when engaging each other will when being displaced to the front or rear end position deviate the thrust jet in the flight direction or in the direction opposite thereto.

At the outlet of each lift drive there may be provided a short bent pipe which is rotatable relative to the outlet and has its lower part provided with guiding plates mounted on a ring which is rotable relative to the curved short pipe, said guiding plates being pivotally suspended on said ring.

Referring now to the drawings in detail showing two embodiments of the invention, with both embodiments, the fuselage of an airplane 1 has within the region of its center of gravity S arranged therein a cruising drive 2 provided with swivel nozzles, i.e. a pair of cold and hot nozzles. The hot nozzles are located ahead of the center of gravity S while the cold nozzles are located behind said center of gravity. These positions, however, may also be exchanged. Ahead and behind the cruising drive 2 there is respectively provided a lift drive 3. According to the embodiment shown in FIGS. 1-4, adjacent other outlets, there are provided control members 5, 5' in the exhaust passages which control members are adapted to be displaced forwardly and rearwardly whereby the outlet openings 4 change their position relative to the center of gravity S of the airplane and the jets being exhausted are deviated so that the lever arms of the jets change their position relative to the center of gravity S.

In the side views according to FIGS. 1-3, the control members 5, 5' have a triangular cross-sectional shape. According to the bottom view of FIG. 4, the said control members 5, 5' as well as the lower portion of the exhaust passages have a rectangular cross section.

The displacement of the control members 5, 5' may be effected in any convenient manner by standard means, for instance, hydraulic cylinder piston means. The two control members 5, 5' of each outlet may be actuated individually as well as together. The control members of the rear outlet may be adjusted either in the same direction and simultaneously with those of the front outlet or independently thereof.

According to the second embodiment illustrated in FIGS. 5–7, adjacent to the lift drive outlets, short bent pipes 6 are arranged in the exhaust gas passages, said short pipes 6 being rotatable relative to the drive outlets. Such rotation is effected by means of an adjusting motor 7 through the intervention of a pinion 8 and a gear ring 9 mounted on the pipe 6. The lower portion of pipe 6 is provided with a ring 11 which is rotatable relative to said pipe 6 and is equipped with guiding plates 10. These guiding plates or vanes, as illustrated in FIG. 11, may be pivoted, for instance, by means of a rack 12 in the ring 11. By rotating ring 11 relative to the turned pipe 6 in conformity with the turning angle of the curved pipe 6, the thrust jet can be so directed that it extends parallel to the central longitudinal plane of the airplane which means that the thrust jet in addition to having a lift component also will have a relatively large forward driving or propulsion component.

By means of the device of the displaceable control members 5 of the first embodiment (FIGS. 1–4) or the rotatable curved short pipe 6 of the second embodiment (FIGS. 5–7), the jets of the lift drive 3 may be deviated or displaced with regard to their point of attack whereby the lever arms of the thrust jets are changed relative to the center of gravity of the airplane in the sense of producing such moments which counteract the resulting torque resulting from the heating up of the cold nozzles or the turning on of the afterburners for the hot nozzles, or from the pivoting of the swivel nozzles of the cruise drive. According to the second embodiment (FIGS. 5–7) the two curved short pipes 6 are adjusted in opposite direction with each other in order to prevent a rolling moment.

It is, of course, to be understood that the present invention is not limited to the particular showing in the drawings, but also comprises modifications within the scope of the disclosure.

What I claim is:

1. In combination with a vertical take-off and landing airplane equipped within the region of its center of gravity with cruising drive means comprising at least one dual stream jet power plant including swivel nozzle means for cold thrust jets and swivel nozzle means for hot thrust jets respectively arranged on opposite sides forwardly and rearwardly respectively of said center of gravity in the longitudinal flight direction of said airplane, an apparatus for maintaining the equilibrium of the moments around the transverse axis of said airplane, which includes: at least two lift drive means respectively arranged in front and in rear of said cruising drive means and having an outlet and control means associated therewith and being operable selectively to guide the thrust jets passing through said outlet so as to cause said thrust jets to act as lift jets or to exert a moment acting counter to the predominance of a torque in one direction, said control means including a short curved S-shaped pipe rotatable about a pivot axis substantially parallel to vertical axis of the airplane relative to the respective outlet pertaining thereto, each said outlet having a specific exit cross section in a horizontal plane transverse to the vertical axis of the airplane so as to maintain purely vertical lift thrust in an unabated manner, ring means adjacent the outer end of the respective outlet, guiding vane means pivotally supported by said ring means, and means operatively connected to said ring means and the guiding vane means pertaining thereto for adjusting said guiding vane means in response to a turning movement of said ring means whereby change of equilibrium of moments is attained particularly by a parallel shifting of vertical lift thrust vector relationship.

References Cited

UNITED STATES PATENTS

| 3,020,714 | 2/1962  | Eggers et al. | 239—265.19 |
|-----------|---------|---------------|------------|
| 3,155,342 | 11/1964 | Bolkow et al. | 244—12     |
| 3,281,082 | 10/1966 | Kerry         | 239—265.35 |
| 3,347,493 | 10/1967 | Leathley      | 244—12     |

FOREIGN PATENTS 1,033,429  6/1966  Great Britain.

OTHER REFERENCES

German application No. 1,267,992, dated June 24, 1966.

MILTON BUCHLER, Primary Examiner

J. E. PITTENGER, Assistant Examiner

U.S. Cl. X.R.

244—12